United States Patent [19]

Sasahara

[11] Patent Number: 5,712,714
[45] Date of Patent: Jan. 27, 1998

[54] IMAGE PROCESSING APPARATUS

[75] Inventor: Tatsuo Sasahara, Osaka, Japan

[73] Assignee: Mita Industrial Co., Ltd., Osaka, Japan

[21] Appl. No.: 500,360

[22] Filed: Jul. 10, 1995

[30] Foreign Application Priority Data

Jul. 18, 1994 [JP] Japan .................. 6-165533
Jul. 18, 1994 [JP] Japan .................. 6-165534

[51] Int. Cl.$^6$ ............................................. H04N 1/04
[52] U.S. Cl. .................... 358/474; 358/460; 395/115; 382/305
[58] Field of Search ......................... 358/404, 452, 358/453, 460, 474; 382/305, 267, 296–298; 395/115, 116

[56] References Cited

U.S. PATENT DOCUMENTS

| | | | |
|---|---|---|---|
| 5,313,311 | 5/1994 | Brandkamp | 382/296 |
| 5,384,645 | 1/1995 | Hasegawa | 382/296 |
| 5,396,607 | 3/1995 | Shimatani | 358/460 |
| 5,483,354 | 1/1996 | Kessels | 382/297 |
| 5,517,587 | 5/1996 | Baker | 358/444 |

FOREIGN PATENT DOCUMENTS

| | | | |
|---|---|---|---|
| 1-251286 | 10/1989 | Japan | G06F 15/66 |
| 5-20450 | 1/1993 | Japan | G06F 15/66 |

*Primary Examiner*—Thomas D. Lee
*Assistant Examiner*—Jerome Grant, III
*Attorney, Agent, or Firm*—Rabin, Champagne & Lynt, P.C.

[57] ABSTRACT

An image processing apparatus in which an original image read by a scanner is rotated by an angle of 90° to be output. One-page image data output from the scanner is stored in a memory on a dot-by-dot basis. The memory is adapted to read therefrom and write therein dot data along a dot array and along a line array. A first read-out operation in which the dot data are successively read out of the memory along the dot array and a second read-out operation in which the dot data are successively read out of the memory along the line array are alternately switched every time reading a one-page image of the document original is competed. Dot data newly generated is written in a storage area from which the previous dot data has been read out at substantially the same time when the previous dot data is read out of the memory.

10 Claims, 12 Drawing Sheets

FIG. 4A

| 0<br>(1) | 1<br>(2) | 2<br>(3) | 3<br>(4) | 4<br>(5) |
|---|---|---|---|---|
| 5<br>(6) | 6<br>(7) | 7<br>(8) | 8<br>(9) | 9<br>(10) |
| 10<br>(11) | 11<br>(12) | 12<br>(13) | 13<br>(14) | 14<br>(15) |
| 15<br>(16) | 16<br>(17) | 17<br>(18) | 18<br>(19) | 19<br>(20) |
| 20<br>(21) | 21<br>(22) | 22<br>(23) | 23<br>(24) | 24<br>(25) |

| 0<br>(21)' | 1<br>(16)' | 2<br>(11)' | 3<br>(6)' | 4<br>(1)' |
|---|---|---|---|---|
| 5<br>(22)' | 6<br>(17)' | 7<br>(12)' | 8<br>(7)' | 9<br>(2)' |
| 10<br>(23)' | 11<br>(18)' | 12<br>(13)' | 13<br>(8)' | 14<br>(3)' |
| 15<br>(24)' | 16<br>(19)' | 17<br>(14)' | 18<br>(9)' | 19<br>(4)' |
| 20<br>(25)' | 21<br>(20)' | 22<br>(15)' | 23<br>(10)' | 24<br>(5)' |

| 0<br>(25)″ | 1<br>(24)″ | 2<br>(23)″ | 3<br>(22)″ | 4<br>(21)″ |
|---|---|---|---|---|
| 5<br>(20)″ | 6<br>(19)″ | 7<br>(18)″ | 8<br>(17)″ | 9<br>(16)″ |
| 10<br>(15)″ | 11<br>(14)″ | 12<br>(13)″ | 13<br>(12)″ | 14<br>(11)″ |
| 15<br>(10)″ | 16<br>(9)″ | 17<br>(8)″ | 18<br>(7)″ | 19<br>(6)″ |
| 20<br>(5)″ | 21<br>(4)″ | 22<br>(3)″ | 23<br>(2)″ | 24<br>(1)″ |

| 0<br>(5)‴ | 1<br>(10)‴ | 2<br>(15)‴ | 3<br>(20)‴ | 4<br>(25)‴ |
|---|---|---|---|---|
| 5<br>(4)‴ | 6<br>(9)‴ | 7<br>(14)‴ | 8<br>(19)‴ | 9<br>(24)‴ |
| 10<br>(3)‴ | 11<br>(8)‴ | 12<br>(13)‴ | 13<br>(18)‴ | 14<br>(23)‴ |
| 15<br>(2)‴ | 16<br>(7)‴ | 17<br>(12)‴ | 18<br>(17)‴ | 19<br>(22)‴ |
| 20<br>(1)‴ | 21<br>(6)‴ | 22<br>(11)‴ | 23<br>(16)‴ | 24<br>(21)‴ |

| (5) | (4) | (3) | (2) | (1) | ←101 |
| (10) | (9) | (8) | (7) | (6) | ←102 |
| (15) | (14) | (13) | (12) | (11) | ←103 |
| (20) | (19) | (18) | (17) | (16) | ←104 |
| (25) | (24) | (23) | (22) | (21) | ←105 |

FIG. 8B

| (10)' | (5)' | | (5) | (4) | (3) | ←101 |
| (9)' | (4)' | | (10) | (9) | (8) | ←102 |
| (8)' | (3)' | | (15) | (14) | (13) | ←103 |
| (12)' | (7)' | (2)' | (20) | (19) | | ←104 |
| (11)' | (6)' | (1)' | (25) | (24) | | ←105 |

FIG. 8C

| (25)' | (20)' | (15)' | (10)' | (5)' | ←101 |
| (24)' | (19)' | (14)' | (9)' | (4)' | ←102 |
| (23)' | (18)' | (13)' | (8)' | (3)' | ←103 |
| (22)' | (17)' | (12)' | (7)' | (2)' | ←104 |
| (21)' | (16)' | (11)' | (6)' | (1)' | ←105 |

FIG. 9A

| (25)′ | (20)′ | (15)′ | (10)′ | (5)′ | ←101 |
| (24)′ | (19)′ | (14)′ | (9)′ | (4)′ | ←102 |
| (23)′ | (18)′ | (13)′ | (8)′ | (3)′ | ←103 |
| (7)′ (2)′ | (6)″ (7)″ (8)″ | | | | ←104 |
| (1)″ (2)″ (3)″ (4)″ (5)″ | | | | | ←105 |

FIG. 9B

| (21)″ | (22)″ | (23)″ | (24)″ | (25)″ | ←101 |
| (16)″ | (17)″ | (18)″ | (19)″ | (20)″ | ←102 |
| (11)″ | (12)″ | (13)″ | (14)″ | (15)″ | ←103 |
| (6)″ | (7)″ | (8)″ | (9)″ | (10)″ | ←104 |
| (1)″ | (2)″ | (3)″ | (4)″ | (5)″ | ←105 |

FIG. 9C

| (24)″ (25)″ | (1)‴ (6)‴ (11)‴ | ←101 |
| (19)″ (20)″ | (2)‴ (7)‴ (12)‴ | ←102 |
| (14)″ (15)″ | (3)‴ (8)‴ (13)‴ | ←103 |
| (8)″ (9)″ (10)″ | (4)‴ (9)‴ | ←104 |
| (3)″ (4)″ (5)″ | (5)‴ (10)‴ | ←105 |

FIG. 9D

| (1)‴ | (6)‴ | (11)‴ | (16)‴ | (21)‴ | ←101 |
| (2)‴ | (7)‴ | (12)‴ | (17)‴ | (22)‴ | ←102 |
| (3)‴ | (8)‴ | (13)‴ | (18)‴ | (23)‴ | ←103 |
| (4)‴ | (9)‴ | (14)‴ | (19)‴ | (24)‴ | ←104 |
| (5)‴ | (10)‴ | (15)‴ | (20)‴ | (25)‴ | ←105 |

FIG. 10A

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 10B

| 21 | 16 | 11 | 6 | 1 |
|---|---|---|---|---|
| 22 | 17 | 12 | 7 | 2 |
| 23 | 18 | 13 | 8 | 3 |
| 24 | 19 | 14 | 9 | 4 |
| 25 | 20 | 15 | 10 | 5 |

A4-ORIENTATION

A4R-ORIENTATION

IMAGE PROCESSING APPARATUS

BACKGROUND OF THE INVENTION

1. Field of the Invention

The present invention relates to image processing apparatuses such as digital copying machines and facsimile machines and, more particularly, to image processing apparatuses capable of performing an image rotating operation on image data read by means of an image scanner.

2. Description of Related Arts

Image processing apparatuses are conventionally available which can perform various image processing operations on image data generated by optically reading a document original by means of an image scanner. One exemplary image processing apparatus is a digital copying machine which forms on a copy sheet an image corresponding to image data subjected to various image processing operations. Another exemplary image processing apparatus is a facsimile machine which reproduces on a copy sheet an image corresponding to image data subjected to image processing operations on a transmitter side and transmitted thereto via a telephone line.

Some of the aforesaid image forming apparatuses can perform an image rotating operation on image data generated by an image scanner. The image rotating operation is useful, for example, when it is desired to copy a document original on a copy sheet different in size from the document original or to realize a sorter function with a digital copying machine having no sorter.

More specific explanation will be given to this image rotating operation, taking as an example a case where a document original of JIS A4 size (210×297) is copied with a longitudinal side thereof being aligned with a base line of a copying machine. As shown in FIG. 12A, an image of the document original is normally copied on a copy sheet of A4 size which is the same as that of the document original, and the copy sheet is transported with the longitudinal side thereof advancing in front (i.e., in A4-orientation). On the other hand, where the image rotating operation is performed to rotate the image data of the document original of A4 size by an angle of 90°, the image data is copied on a copy sheet of A4 size which is transported with the transverse side thereof advancing in front (i.e., in A4R-orientation) as shown in FIG. 12B.

Thus, by alternately repeating the aforesaid copying operations in such copying machine capable of transporting A4-sized copy sheets both in A4-orientation and in A4-orientation, copy sheets transported in A4-orientation and those transported in A4R-orientation are alternately piled on a sheet discharge tray of the copying machine, thereby realizing the sorter function.

A copying machine capable of transporting an A4-sized copy sheet in A4-orientation but incapable of transporting it in A4-orientation cannot carry out a reduction-copy of a document original of JIS B4 size, because the copy sheet should be transported in A4-orientation to reduction-copy the B4-sized document original on the A4-sized copy sheet. In such a case, the image 90°-rotating operation allows the document original of B4 size to be reduction-copied on an A4-sized copy sheet which is transported in A4-orientation.

An exemplary digital copying machine embodying the image 90°-rotating operation is disclosed in Japanese Unexamined Patent Publication No. 1-251286 (1989). According to this literature, dot data of an image generated by means of an image scanner are sent to an image data rotating section and respectively assigned addresses to be stored therein. Then, the dot data are subjected to the image rotating operation in the image data rotating section. More specifically, a pre-rotation address of dot data to be stored in the first address in the first line, from which dot data is to be read out first after the image rotating operation, is computed. Subsequently, based on the computed address, pre-rotation addresses of dot data to be stored in the rest of the addresses in the first line and then pre-rotation addresses of dot data to be stored in the addresses in the next line are computed. After the address computing process is thus performed for all the lines of the image data, the dot data in the pre-rotation addresses thus computed are moved to the post-rotation addresses and stored therein. Thus, the image can be rotated by an angle of 90° by successively reading out the dot data from the first line.

Another exemplary digital copying machine embodying the image 90°-rotating operation is disclosed in Japanese Unexamined Patent Publication No. 5-20450. According to this literature, dot data constituting image data generated by means of a scanner are stored in an image data memory. A read-out starting address of the image data and read-out direction after the image rotating operation are preliminarily stored in another memory. An address computing circuit successively computes addresses of dot data to be read out, based on the read-out starting address, read-out direction, and longitudinal pixel number and transverse pixel number of the image data stored in the image data memory. Thus, the image data can be rotated by an angle of 90° by successively reading out the dot data, based on the addresses successively computed.

In accordance with the prior art disclosed in Japanese Unexamined Patent Publication No. 1-251286, the dot data in the pre-rotation addresses are moved to the post-rotation addresses after the pre-rotation addresses are computed for all the lines of the image data. Therefore, image data of the next page generated by the image scanner cannot be stored in the image rotating section during the image rotation operation of the current page. For this reason, the image data of the next page is generated after the completion of the image rotating operation of the current page.

In accordance with the prior art disclosed in Japanese Unexamined Patent Publication No. 5-20450, the image data of the next page is generated after the completion of the image rotating operation of the current page, similarly to the aforesaid prior art. This is because the addresses of the dot data of the image to be read out are computed based on the longitudinal pixel number and transverse pixel number of the image data stored in the image data memory.

As can be understood from the foregoing, the data generating operation and the image rotating operation are alternately performed in the above two prior arts and, hence, the copy speed may be reduced compared with a case where the image rotating operation is not performed.

The reduction in the copy speed may be prevented by the speed-up of data generating and data outputting operations. However, the speed-up of these operations requires an expensive scanner and outputting means, thereby increasing the hardware cost.

Another method for preventing the slow-down in the copying operation may be to provide an image data memory having two storage areas each capable of storing one-page of image data and alternately use these two storage areas. However, the image memory generally requires a large capacity, thereby complicating the structure of the copying machine and increasing the hardware cost.

SUMMARY OF THE INVENTION

To overcome the aforesaid technical problems, it is an object of the present invention to provide an image processing apparatus which can prevent the slow-down in the copying operation which may occur when the image rotating operation is performed, and yet has a simple structure.

In the image processing apparatus of the present invention, dot data constituting one-page image data output from a scanner are stored in a memory. The memory allows the dot data to be read therefrom or written therein along a dot array and along a line array. Every time the read-out of a one-page image of a document original is completed, a read-out operation from the memory alternate between a first read-out operation in which the dot data stored in the memory are read out along the dot array and a second read-out operation in which the dot data stored in the memory are read out along the line array. At substantially the same time of the read-out of the dot data from the memory, newly generated dot data are written in storage areas from which the previous dot data have been read out.

With this arrangement, the dot data of the image written in the memory along the dot array are read out of the memory along the line array. As a result, the image data read out of the memory has a data arrangement such that the original image data is transformed into image data which has been rotated by an angle of 90°. The write-in and read-out of image data are almost simultaneously performed and, hence, the slow-down in the copying operation which may occur due to the image rotating operation can be prevented.

By employing a memory capable of storing data of a square image (i.e., an image represented by plural lines each having plural dots the number of which is equal to that of lines), the circuit structure can be simplified, thereby simplifying the copying process.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams illustrating data storage states of the page memory when an image 90°-rotating operation is performed.

FIGS. 5A and 5B are diagrams illustrating data storage states of the page memory when an image 90°-rotating operation is performed.

FIGS. 8A, 8B and 8C are diagrams illustrating data storage states of FIFO/LIFO memories when an image 90°-rotating operation is performed in the image processing section.

FIGS. 9A, 9B, 9C and 9D are diagrams illustrating data storage states of the FIFO/LIFO memories when an image 90°-rotating operation is performed in the image processing section.

FIGS. 10A and 10B are diagrams for explaining a difference between the data storage states of the FIFO/LIFO memories before and after the image 90°-rotating operation is performed in the image processing section.

DESCRIPTION OF THE PREFERRED EMBODIMENTS

Figure 1:
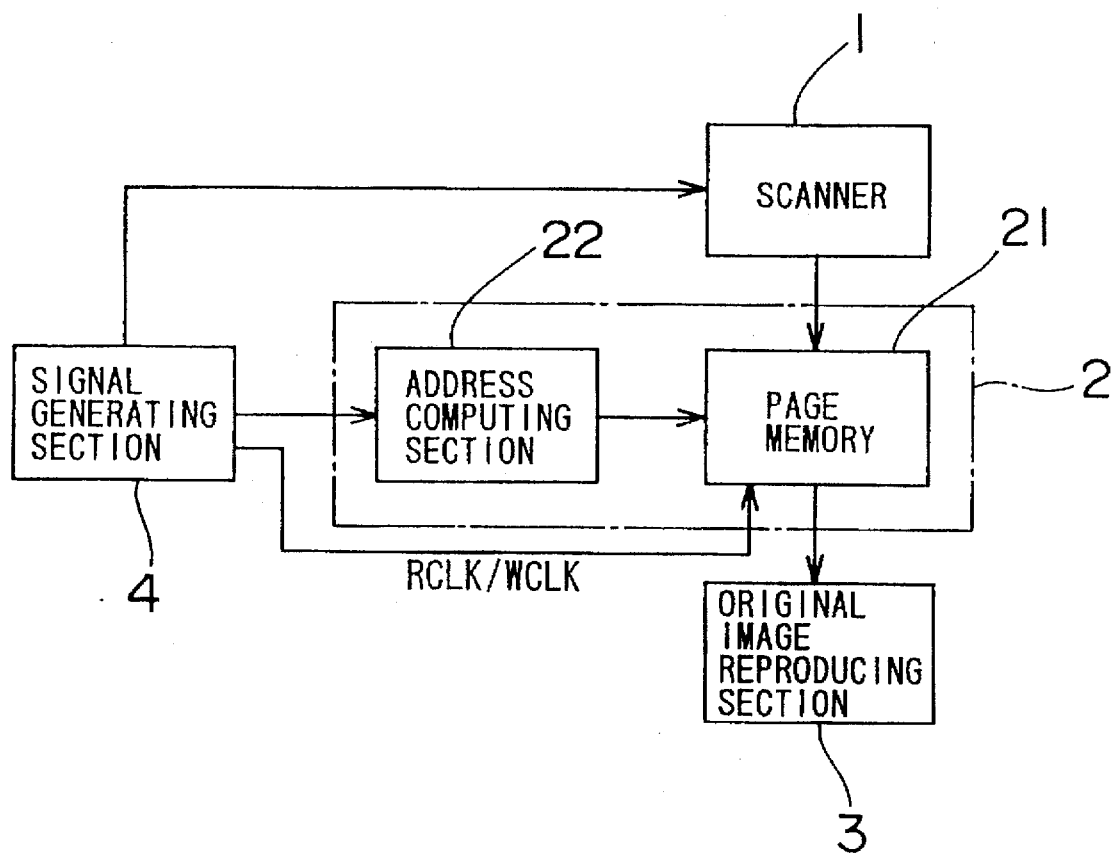
FIG. 1 is a block diagram illustrating an electrical structure of a digital copying machine to which an image processing apparatus according to a first embodiment of the present invention is applied.

FIG. 1 is a block diagram illustrating an electrical structure of a digital copying machine to which an n image processing apparatus according to a first embodiment of the present invention is applied. The digital copying machine includes a scanner 1 for optically scanning a document original to output dot data constituting image data of the document original. The scanner 1 corresponds to an optical reading means. A CCD (charge coupled device) image sensor or CIS image sensor, for example, are applicable to the scanner 1. The dot data output from the scanner 1 are applied to an image processing section 2.

The image processing section 2 performs an image 90°-rotating operation (which will be described later) to rotate the image data by an angle of 90°. The image processing section 2 has a page memory 21 capable of storing one-page image data of the document original output from the scanner 1 and an address computing section 22 for generating addresses to be applied to the page memory 21. The address computing section 22 computes and specifies an address in the page memory 21 for writing or reading dot data in or from the page memory 21. The page memory 21 and address computing section 22 correspond to a storage means and address specifying means, respectively.

The page memory 21 includes, for example, a DRAM. In this embodiment, the page memory 21 is used in a read-modify-write mode (RMWM) which is a standard DRAM operation mode for simultaneous write-in and read-out of data. More specifically, when the address computing section 22 computes and specifies an address, dot data stored in a memory area of the specified address is read out and, at the same time, dot data newly output from the scanner 1 is written in this memory area. The read-out/write-in operation is controlled by a read-out/write-in clock output from a signal generating section 4 which will be described later.

The memory size of the page memory 21 is large enough to accommodate a document original of any size that can be copied by this digital copying machine. For example, the page memory 21 has a memory size of 5000 lines×5000 dots. Such an equilaterally sized memory simplifies its peripheral circuits for an image 90°-rotating operation which will be described later.

The image data read out of the page memory 21 is applied to an original image reproducing section 3. The original image reproducing section 3 reproduces an original image based on the image data applied thereto through the Carlson process.

The digital copying machine further includes the signal generating section 4. The signal generating section 4 outputs various control signals to the scanner 1 and address computing section 22. The signal generating section 4 further serves as a read-out/write-in control means for outputting a read-out/write-in clock RCLK/WCLK to the page memory 21. The signal generating section 4 includes, for example, a microcomputer.

Figure 2:
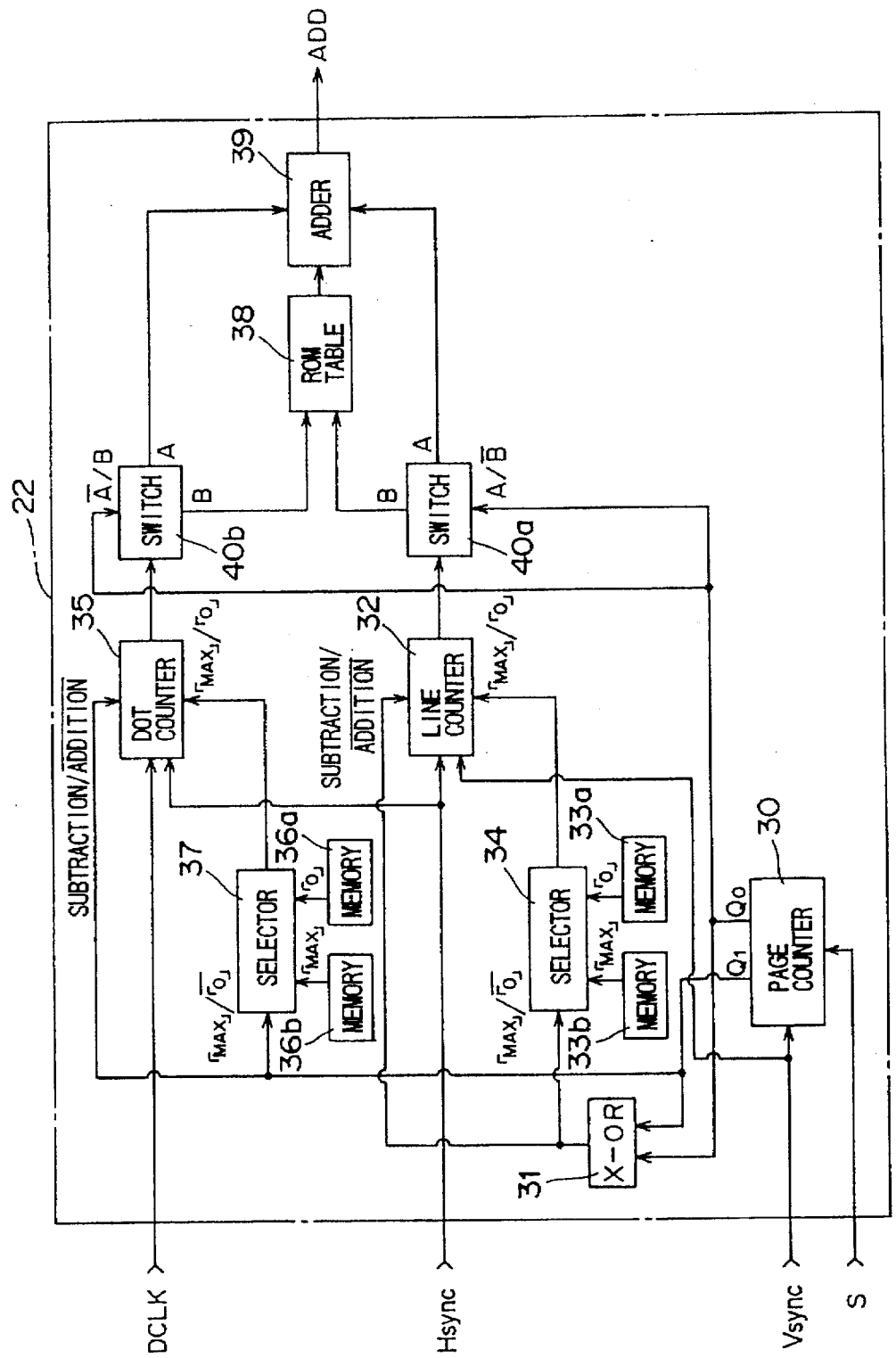
FIG. 2 is a block diagram illustrating an electrical structure of an address computing section.

FIG. 2 is a block diagram illustrating an electrical structure of the address computing section 22. The address computing section 22 has a page counter 30. The page counter 30 receives a vertical synchronization signal Vsync sent from the signal generating section 4 in synchronization with the start of reading a one-page image of a document original. The page counter 30 counts the number of times at which a vertical synchronization signal Vsync is applied thereto, and outputs page clocks $Q_0$ and $Q_1$ in a cycle of four pages, the combination of which page clocks $Q_0$ and $Q_1$ varies every time the counting occurs. The page clocks $Q_0$ and $Q_1$ correspond to a low-level bit and high-level bit, respectively, of a two-bit count value. More specifically, the page clock $Q_0$ shifts between "0" (low level) and "1" (high level) every time a vertical synchronization signal Vsync is applied to the page counter 30, while the page clock $Q_1$ shifts between "0" and "1" every time two vertical synchronization signals Vsync are applied thereto. This is shown in Table 1 which will be explained in detail later.

The page counter 30 receives a copy starting signal S output in response to an operation of a copy button (not shown) provided on the main body of the copying machine. When receiving the copy starting signal S, the page counter 30 clears the count value.

The page clocks $Q_0$ and $Q_1$ output from the page counter 30 are applied to an X-OR (exclusive-OR) gate 31. The X-OR gate 31 outputs a low-level selection signal when the page clocks $Q_0$ and $Q_1$ have the same level, and outputs a high-level signal when the page clocks $Q_0$ and $Q_1$ have different levels.

The address computing section 22 further includes a line counter 32. The line counter 32 receives a horizontal synchronization signal Hsync sent from the signal generating section 4 upon completion of the reading of each line of the document original. The line counter 32 counts the number of times at which a horizontal synchronization signal Hsync is applied thereto, and generates a count value "LINE".

Figure 3:
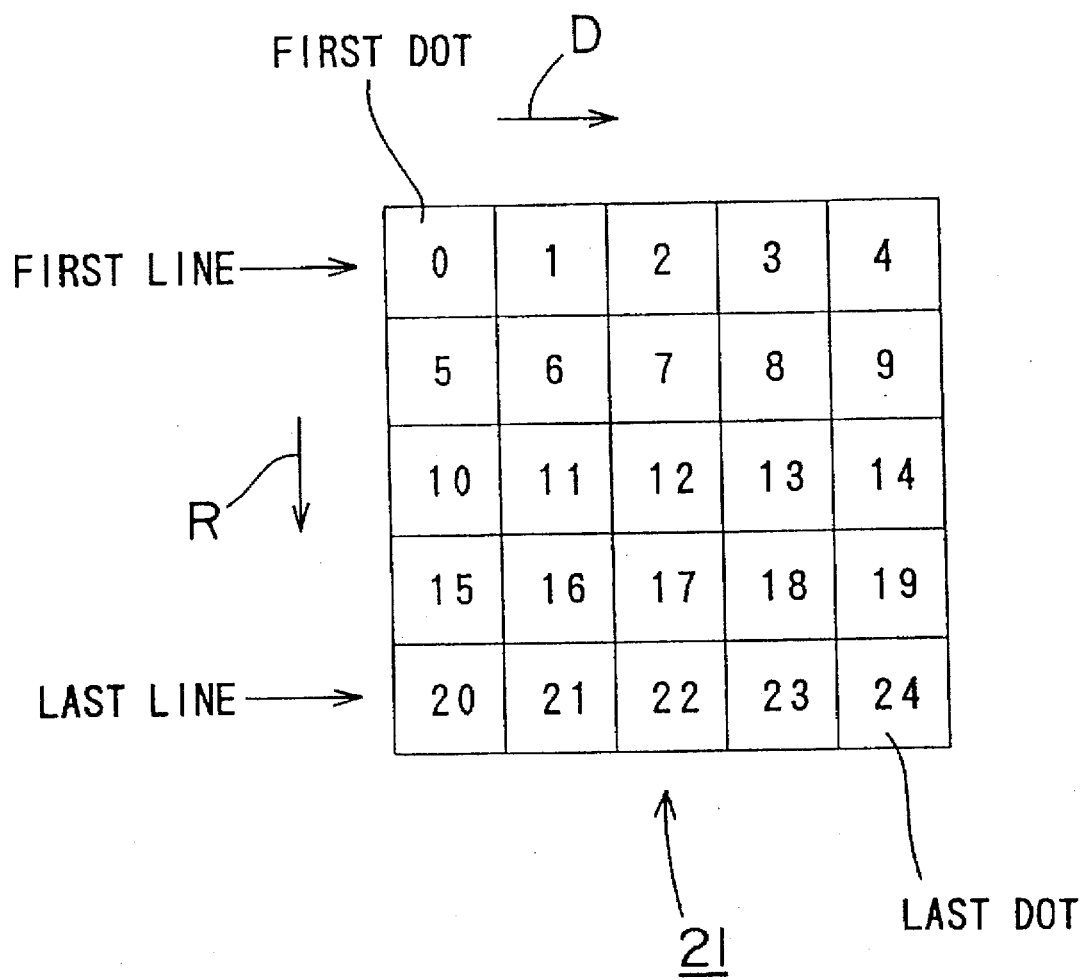
FIG. 3 is a diagram illustrating an exemplary page memory.

The line counter 32 also receives the vertical synchronization signal Vsync. Upon receiving the vertical synchronization signal Vsync, the line counter 32 clears the count value "LINE", and reads therein data output from a selector 34. The selector 34 selects either one of reference values "0" and "MAX" which are stored in memories 33a and 33b, respectively. The selection by the selector 34 is determined by the selection signal output from the X-OR gate 31. More specifically, when the selection signal is low, the reference value "0" is selected, and when the selection signal is high, the reference value "MAX" is selected. The reference value "MAX" corresponds to the address of the last dot in the first line in the page memory 21 (see FIG. 1). Assuming that the page memory 21 is capable of storing image data of 5 dots×5 lines as shown in FIG. 3, for example, addresses are successively assigned to storage areas of the page memory 21 from the first dot in the first line to the last dot in the last line along the dot array direction D. In this case, the reference value "MAX" is "4".

The line counter 32 adds the count value "LINE" corresponding to the number of horizontal synchronization signals Hsync applied thereto to the reference value applied thereto from the selector 34, or subtracts the count value "LINE" from the reference value. Whether the line counter 32 performs the addition operation or subtraction operation is determined by the selection signal sent from the X-OR gate 31. That is, the line counter 32 performs the addition operation if the selection signal is low, and performs the subtraction operation if the selection signal is high.

More specifically, if the selection signal is low, the selector 34 outputs the reference value "0", and the line counter 32 performs the addition operation. Therefore, the line counter 32 adds the reference value "0" to the count value "LINE" and obtains a calculation result "LINE" if the selection signal is low. On the other hand, if the selection signal is high, the selector 34 outputs the reference value "MAX", and the line counter 32 performs the subtraction operation. Therefore, the line counter 32 subtracts the count value "LINE" from the reference value "MAX" and obtains a calculation result "MAX-LINE" if the selection signal is high.

If the (4n-3)-th or 4n-th page of the document original is to be read, a calculation result "LINE" is generated, and if the (4n-2)-th or (4n-1)-th page of the document original is to be read, a calculation result "MAX-LINE" is generated. The calculation result "LINE" or "MAX-LINE" is applied to a ROM table 38 or adder 39 via a switch 40a.

The address computing section 22 further includes a dot counter 35. The dot counter 35 receives a dot clock DCLK sent from the signal generating section 4. The dot clock DCLK is generated upon completion of the reading of each dot of the document original. The dot counter 35 counts the number of times at which a dot clock DCLK is applied thereto, and generates a count value "DOT".

The dot counter 35 also receives the horizontal synchronization signal Hsync. Upon receiving the horizontal synchronization signal Hsync, the dot counter 35 clears the count value "DOT", and reads therein data output from a selector 37. The selector 37 selects to output either of two reference values "0" and "MAX" which are stored in memories 36i a 1 and 36b, respectively. The selection by the selector 37 is determined by the page clock $Q_1$ output from the page counter 30. More specifically, when the page clock $Q_1$ is low, the reference value "0" is selected, and when the page clock $Q_1$ is high, the reference value "MAX" is selected. The reference value "MAX" stored in the memory 36b is the same as the reference value "MAX" stored in the memory 33b.

The dot counter 35 adds the count value "DOT" corresponding to the number of dot clocks DCLK applied thereto to the reference value applied thereto from the selector 37, or subtracts the count value "DOT" from the reference value. Whether the dot counter 35 performs the addition operation or subtraction operation is determined by the page clock $Q_1$ output from the page counter 30. That is, the dot counter 35 performs the addition operation if the page clock $Q_1$ is low, and performs the subtraction operation if the page clock $Q_1$ is high.

More specifically, if the page clock $Q_1$ is low, the selector 37 outputs the reference value "0" and the dot counter 35 performs the addition operation. Therefore, the dot counter 35 adds the reference value "0" to the count value "DOT" and obtains a calculation result "DOT". On the other hand, if the page clock $Q_1$ is high, the selector 37 outputs the reference value "MAX", and the dot counter 35 performs the subtraction operation. Therefore, the dot counter 35 subtracts the count value "DOT" from the reference value "MAX" and obtains a calculation result "MAX-DOT".

If the (4n-3)-th or (4n-2)-th page of the document original is to be read, a calculation result "DOT" is generated, and if the (4n-1)-th or (4n-th page of the document original is to be read, a calculation result "MAX–DOT" is generated. Then, the calculation result "DOT" or "MAX–DOT" is applied to the ROM table 38 or adder 39 via a switch 40b, similarly to the case of the line counter 32.

The page clock $Q_0$ is applied as an open/close control signal to the switches 40a and 40b to which outputs of the line counter 32 and dot counter 35 are respectively applied. More specifically, the switch 40a establishes the continuity between the line counter 32 and adder 39 when the page clock $Q_0$ is high, and establishes the continuity between the line counter 32 and ROM table 38 when the page clock $Q_0$ is low. As a result, the calculation result "LINE" or "MAX-LINE" output from the line counter 32 is applied to the adder 39 when the page clock $Q_0$ is high, and applied to the ROM table 38 when the page clock $Q_0$ is low.

On the other hand, the switch 40b establishes the continuity between the dot counter 35 and ROM table 38 when the page clock $Q_0$ is high, and establishes the continuity between the dot counter 35 and adder 39 when the page clock $Q_0$ is low. As a result, the calculation result "DOT" or "MAX–DOT" output from the dot counter 35 is applied to the ROM table 38 when the page clock $Q_0$ is high, and applied to the adder 39 when the page clock $Q_0$ is low.

The ROM table 38 converts the calculation result "LINE", "MAX-LINE", "DOT" or "MAX–DOT" applied thereto into an address of the first dot in each line of the page memory 21, and outputs a converted value ROM [LINE], ROM [MAX-LINE], ROM [DOT] or ROM [MAX–DOT]. In the case of the page memory 21 shown in FIG. 3, for example, the outputs of the ROM table 18 are as follows:

ROM [0]=0

ROM [1]=5

ROM [2]=10

ROM [3]=15

ROM [4]=20

The adder 39 adds the value ROM [LINE], ROM [MAX-LINE], ROM [DOT] or ROM [MAX–DOT] output from the ROM table 38 to the calculation result "LINE", "MAX-LINE", "DOT" or "MAX DOT" output from the line counter 32 or dot counter 35.

If the (4n-3)-th page of the document original is to be read, the page clocks $Q_0$ and $Q_1$ are both low. Therefore, the ROM table 38 receives the calculation result "LINE" sent from the line counter 32, and the adder 39 receives the calculation result "DOT" directly sent from the dot counter 35. As a result, an addition value ADD output from the adder 39 is as follows:

ADD=ROM [LINE]+DOT

If the (4n-2)-th page of the document original is to be read, the page clocks $Q_0$ and $Q_1$ are high and low, respectively. Therefore, the ROM table 38 receives the calculation result "DOT" sent from the dot counter 35, and the adder 39 receives the calculation result "MAX-LINE" sent from the line counter 32. As a result, the addition value ADD output from the adder 39 is as follows:

ADD=ROM [DOT ]+(MAX-LINE)

If the (4n-1)-th page of the document original is to be read, the page clocks $Q_0$ and $Q_1$ are low and high, respectively. Therefore, the ROM table 38 receives the calculation result "MAX-LINE" sent from the line counter 32, and the adder 39 receives the calculation result "MAX-DOT" directly sent from the dot counter 35. As a result, the addition value ADD output from the adder 39 is as follows:

ADD=ROM [MAX-LINE]+(MAX-DOT)

If the 4n-th page of the document original is to be read, the page clocks $Q_0$ and $Q_1$ are both high. Therefore, the ROM table 38 receives the calculation result "MAX-DOT" sent from the dot counter 35, and the adder 39 receives the calculation result "LINE" directly sent from the line counter 32. As a result, the addition value ADD output from the adder 39 is as follows:

ADD=ROM [MAX-DOT]+LINE

The addition value ADD output from the adder 39 is applied as an address to the page memory 21. Therefore, dot data stored in an address specified by the addition value ADD output from the adder 39 is read out and, at the same time, new dot data output from the scanner 1 is written in that address ADD in the page memory 21.

Table 1 shows a relationship among a page number of the document original to be read by the scanner 1, page clocks $Q_0$ and $Q_1$, reference data to be read in by the line counter 32 and dot counter 35, a calculating operation to be performed by the line counter 32 and dot counter 35, and continuity directions of the switches 40a and 40b. In Table 1, the character N is a natural number, and the numerals "0" and "1" of the page clocks $Q_0$ and $Q_1$ denote "low level" and "high level", respectively.

TABLE 1

| Page No. | $Q_0$ | $Q_1$ | Reference data to be read into counter 32, Operation | Reference data to be read into counter 35, Operation | Continuity direction of SW 40a | Continuity direction of SW 40b |
|---|---|---|---|---|---|---|
| 4N-3 | 0 | 0 | 0 Addition | 0 Addition | B | A |
| 4N-2 | 1 | 0 | MAX Subtraction | 0 Addition | A | B |
| 4N-1 | 0 | 1 | MAX Subtraction | MAX Subtraction | B | A |
| 4N | 1 | 1 | 0 Addition | MAX Subtraction | A | B |

Next, there will be described an image data write-in operation and image 90°-rotating operation which are both performed in the aforesaid image processing section 2. In the following description, it is assumed for convenience that the document original to be read has a size of 5 lines×5 dots and the page memory has a size of 5 lines×5 dots as shown in FIG. 3. In this case, the reference values "MAX" to be stored in the memories 33b and 36b are both "4". Therefore, the minimum and maximum values output from the line counter 32 or dot counter 35 are "0" and "4", respectively. And the outputs of the ROM table 38 for respective input values are as follows in this embodiment:

ROM [0, 1, 2, 3, 4]={0, 5, 10, 15, 20}

In accordance with this embodiment, the combination of the page clocks $Q_0$ and $Q_1$ varies in a cycle of four pages, as shown in Table 1. Therefore, specific explanation will be given to the image data write-in operation and image rotating operation which are to be performed on the first page ((4N-3)th page, N=1), the second page ((4N-2)-th page, N=1), the third page ((4N-1)-th page, N=1), the fourth page (4N-th page, n=1) and the fifth page ((4N-3)-th page, N=2) of the document original to be read by the scanner 1.

First, the image data write-in operation to be performed when the first page is read will be explained.

When the reading of the first page of the document original is started, the page clocks $Q_0$ and $Q_1$ output from the page counter 30 are both low as shown in Table 1. Therefore, the ROM table 38 receives the calculation result "LINE" sent from the line counter 32, and the adder 39 receives the calculation result "DOT" directly sent from the dot counter 35. In this case, the calculation result "LINE" is "0" and the calculation results "DOT" successively generated are "0", "1", "2", "3" and "4" when the first line of the first page is read by the scanner 1. Therefore, the adder 39 calculates as follows:

$$ADD = ROM [LINE] + DOT = ROM[0] + DOT$$
$$= 0 + (0, 1, 2, 3, 4)$$

As a result, the adder 39 successively outputs addresses ADD specified as "0", "1", "2", "3" and "4" in this order. Thus, dot data (1), (2), (3), (4) and (5) in the first line of the first page read by the scanner 1 are written in the addresses "0", "1", "2", "3" and "4", respectively, of the page memory 21.

When the second line of the document original is read by the scanner 1, the calculation result "LINE" is "1" and the calculation results "DOT" successively generated are "0", "1", "2", "3" and "4". Therefore, the adder 39 calculates as follows:

$$ADD = 5 + (0, 1, 2, 3, 4)$$

As a result, addresses ADD specified as "5", "6", "7", "8" and "9" are successively output in this order. Therefore, dot data (6), (7), (8), (9) and (10) in the second line of the first page read by the scanner 1 are written in the addresses "5", "6", "7", "8" and "9", respectively, of the page memory 21.

Thus, the addresses are successively specified in a dot array direction D (see FIG. 3) when the first page of the document original is read.

The third, fourth and fifth lines are processed in substantially the same manner as described above. Consequently, image data of the first page of the document original is stored in the page memory 21 in a storage state as shown in FIG. 4A.

Next, the image reading and storing operation to be performed on the second page of the document original and the image 90°-rotating operation to be performed at this time on the image data of the first page will be explained.

When the reading of the second page of the document original is started, the page clocks $Q_0$ and $Q_1$ output from the page counter 30 are high and low, respectively, as shown in Table 1. Therefore, the ROM table 38 receives the calculation result "DOT" sent from the dot counter 35, and the adder 39 receives the calculation result "MAX-LINE" directly sent from the line counter 32. In this case, the calculation result "MAX-LINE" is "4" and the calculation results "DOT" successively generated are "0", "1", "2", "3" and "4" when the first line of the second page is read by the scanner 1. Therefore, the adder 39 calculates as follows:

$$ADD = ROM [DOT] + (MAX - LINE)$$
$$= ROM [0, 1, 2, 3, 4] + 4$$
$$= \{0, 5, 10, 15, 20\} + 4$$

As a result, addresses ADD are successively specified as "4", "9", "14", "19" and "24" in this order. Thus, dot data (1)', (2)', (3)', (4)' and (5)' in the first line of the second page read by the scanner 1 are written in the addresses "4", "9", "14", "19" and "24", respectively, of the page memory 21. At the same time, dot data (5), (10), (15), (20) and (25) of the first page respectively stored in the addresses "4", "9", "14", "19" and "24" specified above are read out in this order and applied to the original image reproducing section 3.

When the second line of the second page is read by the scanner 1, the calculation result "MAX-LINE" is "3" and the calculation results "DOT" successively generated are "0", "1", "2", "3" and "4". Therefore, the adder 39 calculates as follows:

$$ADD = ROM [0, 1, 2, 3, 4] + 3$$
$$= \{0, 5, 10, 15, 20\} + 3$$

As a result, addresses ADD are successively specified as "3", "8", "13", "18" and "23" in this order. Therefore, dot data (6)', (7)', (8)', (9)' and (10)' in the second line of the second page read by the scanner 1 are written in the addresses "3", "8", "13", "18" and "23", respectively, of the page memory 21. At the same time, dot data (4), (9), (14), (19) and (24) of the first page respectively stored in the addresses "3", "8", "13", "18" and "23" specified above are read out in this order and applied to the original image reproducing section 3.

Thus, the addresses are successively specified in a line array direction R (see FIG. 3) when the second page of the document original is read.

The third, fourth and fifth lines are processed in substantially the same manner as described above. Consequently, image data of the second page is stored in the page memory 21 in a storage state as shown in FIG. 4B.

The dot data (5), (10), (15), (20), (25); (4), (9), (14), (19), (24); . . . of the first page stored in the page memory 21 are read out in this order, and applied to the original image reproducing section 3. That is, the last dots in the respective lines of the first page constitute the first line of the image data thus read out, and the second last dots in the respective lines constitute the second line of the image data. Hence, the original image reproducing section 3 reproduces the image of the first page which has been rotated by an angle of 90°.

Next, the image reading and storing operation to be performed on the third page of the document original and the image 90°-rotating operation to be performed at this time on the image data of the second page will be explained.

When the reading of the third page of the document original is started, the page clocks $Q_0$ and $Q_1$ output from the page counter 30 are low and high, respectively, as shown in Table 1. Therefore, the ROM table 38 receives the calculation result "MAX-LINE" sent from the line counter 32, and the adder 39 receives the calculation result "MAX-DOT" directly sent from the dot counter 35. In this case, the calculation result "MAX-LINE" is "4" and the calculation results "MAX-DOT" successively generated are "4", "3", "2", "1" and "0" when the first line of the document original is read by the scanner 1. Therefore, the adder 39 calculates as follows:

$$ADD = ROM [MAX - LINE] + (MAX - DOT)$$
$$= ROM [4] + (4, 3, 2, 1, 0)$$
$$= 20 + (4, 3, 2, 1, 0)$$

As a result, addresses ADD are successively specified as "24", "23", "22", "21" and "20" in this order. Thus, dot data (1)", (2)", (3)", (4)" and (5)" in the first line of the third page read by the scanner 1 are written in the addresses "24", "23", "22", "21" and "20", respectively, of the page memory 21. At the same time, dot data (5)', (10)', (15)', (20)' and (25)' of the second page respectively stored in the addresses "24", "23", "22", "21" and "20" specified above are read out in this order and applied to the original image reproducing section 3.

When the second line of the third page is read by the scanner 1, the calculation result "MAX-LINE" is "3" and the calculation results "MAX-DOT" successively generated are "4", "3", "2", "1" and "0". Therefore, the adder 39 calculates as follows:

$$\begin{aligned} ADD &= ROM\,[3] + (4, 3, 2, 1, 0) \\ &= 15 + (4, 3, 2, 1, 0) \end{aligned}$$

As a result, addresses ADD are successively specified as "19", "18", "17", "16" and "15" in this order. Therefore, dot data (6)", (7)", (8)", (9)" and (10)" in the second line of the third page read by the scanner 1 are written in the addresses "19", "18", "17", "16" and "15", respectively, of the page memory 21. At the same time, dot data (4)', (9)', (14)', (19)' and (24)' of the second page respectively stored in the addresses "19", "18", "17", "16" and "15" specified above are read out in this order and applied to the original image reproducing section 3.

Thus, the addresses are successively specified in a direction reverse to the dot array direction D (see FIG. 3) when the third page of the document original is read.

The third, fourth and fifth lines are processed in substantially the same manner as described above. Consequently, image data of the third page is stored in the page memory 21 in a storage state as shown in FIG. 5A.

The dot data (5)', (10)', (15)', (20)', (25)'; (4)', (9)', (14)', (19)', (24)'; . . . of the second page stored in the page memory 21 are read out in this order, and applied to the original image reproducing section 3. That is, the last dots in the respective lines of the second page constitute the first line of the image data thus read out, and the second last dots in the respective lines constitute the second line of the image data. Hence, the original image reproducing section 3 reproduces the image of the second page which has been rotated by an angle of 90°.

Next, the image reading and storing operation to be performed on the fourth page of the document original and the image 90°-rotating operation to be performed at this time on the image data of the third page will be explained.

When the reading of the fourth page of the document original is started, the page clocks $Q_0$ and $Q_1$ output from the page counter 30 are both high, as shown in Table 1. Therefore, the ROM table 38 receives the calculation result "MAX-DOT" sent from the dot counter 35, and the adder 39 receives the calculation result "LINE" directly sent from the line counter 32. In this case, the calculation result "LINE" is "0" and the calculation results "MAX-DOT" successively generated are "4", "3", "2", "1" and "0" when the first line of the document original is read by the scanner 1. Therefore, the adder 39 calculates as follows:

$$\begin{aligned} ADD &= ROM\,[MAX - DOT] + LINE \\ &= ROM\,[4, 3, 2, 1, 0] + 0 \\ &= \{20, 15, 10, 5, 0\} + 0 \end{aligned}$$

As a result, addresses ADD are successively specified as "20", "15", "10", "5" and "0" in this order. Thus, dot data (1)''', (2)''', (3)''', (4)''' and (5)''' in the first line of the fourth page read by the scanner 1 are written in the addresses "20", "15", "10", "5" and "0", respectively, of the page memory 21. At the same time, dot data (5)", (10)", (15)", (20)" and (25)" of the third page respectively stored in the addresses "20", "15", "10", "5" and "0" specified above are read out in this order and applied to the original image reproducing section 3.

When the second line of the fourth page is read by the scanner 1, the calculation result "LINE" is "1" and the calculation results "MAX-DOT" successively generated are "4", "3", "2", "1" and "0". Therefore, the adder 39 calculates as follows:

$$ADD = \{20, 15, 10, 5, 0\} + 1$$

As a result, addresses ADD are successively specified as "21", "16", "11", "6" and "1" in this order. Therefore, dot data (6)''', (7)''', (8)''', (9)''' and (10)''' in the second line of the fourth page read by the scanner 1 are written in the addresses "21", "16", "11", "6" and "1", respectively, of the page memory 21. At the same time, dot data (4)", (9)", (14)", (19)" and (24)" of the third page respectively stored in the addresses "21", "16", "11", "6" and "1" specified above are read out in this order and applied to the original image reproducing section 3.

Thus, the addresses are successively specified in a direction reverse to the line array direction R when the fourth page of the document original is read.

The third, fourth and fifth lines are processed in substantially the same manner as described above. Consequently, image data of the fourth page is stored in the page memory 21 in a storage state as shown in FIG. 5B.

The dot data (5)", (10)", (15)", (20)", (25)"; (4)", (9)", (14)", (19)", (24)"; . . . of the third page stored in the page memory 21 are read out in this order, and applied to the original image reproducing section 3 as described above. That is, the last dots in the respective lines of the third page constitute the first line of the image data thus read out, and the second last dots in the respective lines constitute the second line of the image data. Hence, the original image reproducing section 3 reproduces the image of the third page which has been rotated by an angle of 90°.

Next, the image 90°-rotating operation to be performed on the image data of the fourth page when the fifth page of the document original is read will be explained.

An explanation for the image data write-in operation for the fifth page of the document original is omitted, because this operation is substantially the same as the image data write-in operation for the first page in this embodiment, except that there have already been stored image data in the page memory 21 in the case of the fifth page. Therefore, a brief explanation will be given to how to read out the image data stored in the page memory 21.

When the first, second, . . . and fifth lines of the fifth page of the document original are read by the scanner 1, the addresses ADD specified by the address computing section 22 are "0", "1", "2", "3", "4"; "5", "6", "7", "8", "9"; . . . ; and "20", "21", "22", "23", "24", respectively, as previously described. Thus, dot data (5)''', (10)''', . . . , (25)''; (4)''', (9)''', . . . , (24)'''; . . . of the fourth page read by the scanner 1 are read out in this order and applied to the original image reproducing section 3. That is, the last dots in the respective lines of the fourth page constitute the first line of the image data thus read out, and the second last dots in the respective lines constitute the second line of the image data. Hence, the original image reproducing section 3 reproduces the image of the fourth page which has been rotated by an angle of 90°.

As can be understood from the foregoing, the digital copying machine according to this embodiment alternates two address specifying methods (one for specifying addresses in the dot array direction D and the other for specifying addresses in the line array direction R) to be employed for the image data read-out/write-in operation every time a new page of the document original is read, thereby realizing the image 90°-rotating operation. Further, the image data read-out operation for the previous page can be performed simultaneously with the write-in operation for newly read image data. Therefore, the reading of the document original can be continuously performed, thereby preventing the slow-down in the copying process which may occur due to the image 90°-rotating operation.

Further, there is no need to increase the reading speed of the scanner 1 to ensure a copying speed comparative to that of a conventional copying machine, thereby reducing the hardware cost of the digital copying machine.

Though the aforesaid address calculating section 22 is embodied by a hardware in accordance with this embodiment, the function thereof may be embodied by a software incorporated in a microcomputer.

Figure 6:
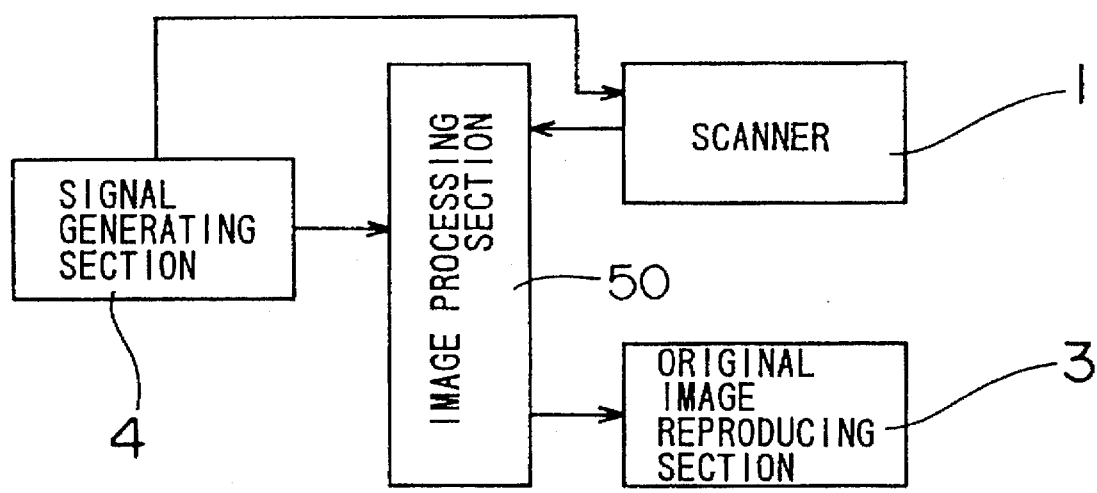
FIG. 6 is a block diagram illustrating a structure of a digital copying machine to which an image processing apparatus according to a second embodiment of the present invention is applied.

FIG. 6 is a block diagram illustrating an electrical structure of a digital copying machine to which an image processing apparatus according to a second embodiment of the present invention is applied. In FIG. 6, respective parts having like functions as those shown in FIG. 1 are designated by identical reference numerals.

An image processing section 50 to which image data is output from a scanner 1 can perform an image 90°-rotating operation on the image data. The image data which have been subjected to the image 90°-rotating operation in the image processing section 50 are applied to an original image reproducing section 3.

Figure 7:
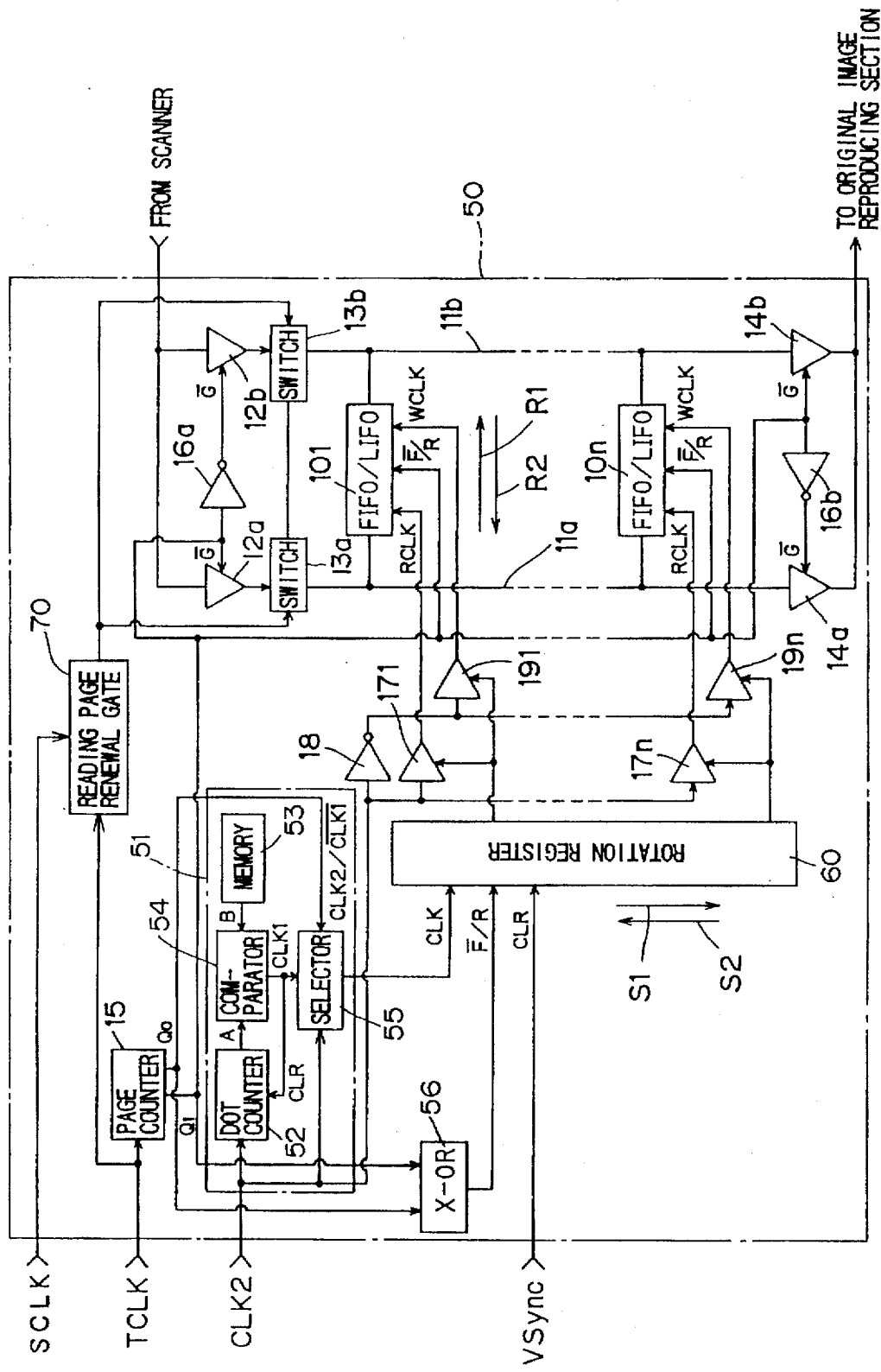
FIG. 7 is a block diagram illustrating an electrical structure of an image processing section.

FIG. 7 is a block diagram illustrating an electrical structure of the image processing section 50. The image processing section 50 includes n first-in-first-out/last-in-first-out (FIFO/LIFO) memories 101, 102, ... and 10n (n: an integer not less than 2) connected in parallel. These FIFO/LIFO memories may be generally denoted by a numeral 10 hereinafter for the purpose of simplicity. The FIFO/LIFO memories 10 serve as a memory means for storing therein line data corresponding to respective lines of the image data output from the scanner 1. The n FIFO/LIFO memories 101, 102, ... and 10n each have both a first-in-first-out (FIFO) function and a last-in-first-out (LIFO) function.

The total memory size of the FIFO/LIFO memories 10 is large enough to accommodate a document original of any size that can be copied by this digital copying machine. For example, the FIFO/LIFO memories 101, 102, ... and 10n each include a line memory having a memory size of 5000 dots. In this case, n=5000, and the total memory size of the FIFO/LIFO memories 10 is 5000 lines×5000 dots. Such an equilaterally-sized memory simplifies its peripheral circuits for the image 90°-rotating operation which will be described later.

The FIFO/LIFO memories 10 are connected in parallel between signal lines 11a and 11b via which the image data is sent from the scanner 1 to the original image reproducing section 3. The image data generated by the scanner 1 is sent out to the signal lines 11a and 11b via gates 12a and 12b and switches 13a and 13b. Gates 14a and 14b are respectively disposed in the midst of data transfer paths extending from the signal lines 11a and 11b to the original image reproducing section 3.

The switches 13a and 13b receive a trigger clock TCLK sent from the signal generating section 4 via a reading page renewal gate 70. The trigger clock TCLK rises to high level when the reading of a one-page image is completed and a next page of the document original is to be read. The trigger clock TCLK is kept at high-level as long as image data is sent to the original image reproducing section 3. The signal generating section 4 applies a page renewal gate clock SCLK to the reading page renewal gate 70. The gate 70 is open when the page renewal gate clock SCLK is at high-level, and the gate 70 is closed when the clock SCLK is at low-level. The page renewal gate clock SCLK is kept at high-level during the period when the one-page image data is sent from the scanner 1.

When the trigger clock TCLK is high, the switches 13a and 13b respectively establish the continuity between the gate 12a and signal line 11a and between the gate 12b and signal line 11b, while interrupting the continuity between the switches 13a and 13b. Consequently, the image data output from the scanner 1 is transferred to the signal line 11a via the gate 12a or to the signal line 11b via the gate 12b.

On the other hand, when the trigger clock TCLK is low, the switches 13a and 13b respectively interrupt the continuity between the gate 12a and signal line 11a and between the gate 12b and signal line 11b, while establishing the continuity between the switches 13a and 13b. Consequently, even if the image data is transferred to the gate 12a and 12b from the scanner 1, the image data is not transferred to the signal lines 11a and 11b. Further, if the image data is sent out of the FIFO/LIFO memories 10 to one of the signal lines 11a and 11b, the image data is applied to the other of the signal lines 11b and 11a.

The image processing section 50 further includes a page counter 15 functioning as a clock generating means. The page counter 15 receives the trigger clock TCLK, and counts the number of times at which the trigger clock TCLK is applied thereto (or the number of rising edges). The page counter 15 outputs page clocks $Q_0$ and $Q_1$ in a cycle of four pages, the combination of which page clocks $Q_0$ and $Q_1$ differs every time the counting occurs. The page clocks $Q_0$ and $Q_1$ correspond to a low-level bit and high-level bit, respectively, of a two-bit count value. More specifically, the page clock $Q_0$ shifts between "0" (low level) and "1" (high level) every time a trigger clock TCLK is applied to the page counter 15 and the page clock $Q_1$ shifts between "0" and "1" every time two trigger clocks TCLK are applied thereto. This is shown in Table 2 which will be explained in detail later.

The page clock $Q_1$ output from the page counter 15 is applied as an open/close signal to the gates 12a, 12b, 14a and 14b. More specifically, the gates 12a, 12b, 14a and 14b are rendered open when a low-level signal made of page clock $Q_1$ is applied thereto. Therefore, when the page clock $Q_1$ is low-level, the gate 12a and 14b are open, and the gates 12b and 14a are closed because a high-level signal is applied to them via inverting gates 16a and 16b. On the other hand, when the high-level page clock $Q_1$ is high-level, the gates 12a and 14b are closed and the gates 12b and 14a are open.

Thus, the image data generated by the scanner 1 is sent to the signal line 11a via the gate 12a when the page clock $Q_1$ is low, and sent to the signal line 11b via the gate 12b when the page clock $Q_1$ is high. However, the image data generated by the scanner 1 is sent to the signal line 11a or 11b only when the trigger clock TCLK is high, i.e., when a new page is to be read by the scanner 1, as previously stated.

The page clock $Q_1$ is also applied to the FIFO/LIFO memories 10. When the page clock $Q_1$ is low, the FIFO/LIFO memories 10 are allowed to shift the image data in a regular direction R1. On the other hand, when the page clock $Q_1$ is high, the FIFO/LIFO memories 10 are allowed to shift the image data in a reverse direction R2.

The FIFO/LIFO memories 10 receive a clock CLK2 sent from the signal generating section 4 via gates 171, 172, ... and 17n (hereinafter denoted by a numeral 17 in the general sense) in synchronization with the scanner 1 generating each of dot data constituting the image data of the document original. The clock CLK2 is further applied to the FIFO/LIFO memories 10 via inverting gates 18 and gates 19₁, 19₂, ... and 19n (hereinafter denoted by a numeral 19 in the general sense) in synchronization with the scanner 1 generating each of the dot data of the document original. The open/close operation of the gates 17 and 19 is controlled by a rotation register 60 which will be described later.

Upon the reception of the clock CLK2 sent via the gates 17, the stored dot data are shifted in the regular direction R1 or in the reverse direction R2 in the FIFO/LIFO memories 10. At this time, dot data stored at the end of each of the FIFO/LIFO memories 10 is read out to the signal line 11a or 11b, if the image data fully occupies the FIFO/LIFO memories 10. On the other hand, upon the reception of the clock CLK2 sent via the inverting gate 18 and gates 19, the dot data which have been sent out to the signal line 11a or 11b are written one by one in the regular direction R1 or in the reverse direction R2 in the FIFO/LIFO memories 10.

A clock CLK2 sent via the gates 17 is hereinafter referred to as "read-out clock RCLK", and a clock CLK2 sent via the inverting gate 18 and gates 19 is referred to as "write-in clock WCLK".

Since the write-in clock WCLK is sent via the inverting gate 18, the FIFO/LIFO memories 10 receive the write-in clock WCLK a little after receiving the read-out clock RCLK. More specifically, the reception delay may be a half cycle. The reception delay is required to prevent the loss of the image data stored in the FIFO/LIFO memories 10 which may occur when the FIFO/LIFO memories 10 are fully occupied by image data. It should be noted that the present invention may be embodied without the inverting gate 18.

A rotation register 60 functions as a write-in/read-out control means for controlling the open/close operation of the gates 17 and 19. The rotation register 60 opens the gates 17 and 19 with a predetermined timing. The timing is determined by a clock CLK output from a clock generating section 51.

The clock generating section 51 includes a dot counter 52 for counting clocks CLK2 and outputting a dot scan number A which is the number of dots scanned by the scanner 1, a memory 53 for preliminarily storing therein a dot number B indicating the number of dots that can be stored in each of the FIFO/LIFO memories 10₁, 10₂, ... and 10n, a comparator 54 and a selector 55.

The dot scan number A is applied to the comparator 54 from the dot counter 52. The comparator 54 outputs a clock CLK1 based on the dot scan number A. More specifically, the comparator 54 first outputs the clock CLK1 when the dot scan number A is applied thereto from the dot counter 52. Thereafter, the comparator 54 compares the dot scan number A with the dot number B stored in the memory 53, and outputs the clock CLK1 if the dot scan number A equals the dot number B. That is, the clock CLK1 is output every time one-line of image data is generated by the scanner 1.

The dot scan number A generated by the dot counter 52 is cleared every time a clock CLK1 is generated.

The selector 55 receives the page clock $Q_0$ sent from the page counter 15 as well as the clocks CLK1 and CLK2. The selector 55 selects either the clock CLK1 or the clock CLK2 based on the page clock $Q_0$, and sends the selected clock CLK (CLK1 or CLK2) to the rotation register 60. More specifically, when the page clock $Q_0$ is high, the clock CLK2 is selected and output. When the page clock $Q_0$ is low, the clock CLK1 is selected and output.

In this embodiment, the clocks CLK1 and CLK2 correspond to a first and second write-in/read-out clocks, respectively, and the clock generating section 51 functions as a write-in/read-out clock generating means.

The rotational direction specifying clock F/R is output from an X-OR gate (exclusive-OR gate) 56 and applied to the rotation register 60. The X-OR gate 56 receives the page clocks $Q_0$ and $Q_1$ sent from the page counter 15. Therefore, the rotational direction specifying clock F/R is low when the page clocks $Q_0$ and $Q_1$ are in the same level, and is high when the page clocks $Q_0$ and $Q_1$ are in different levels. When the rotational direction specifying clock F/R is low, the rotation register 60 outputs an open signal to open the gates 17₁, 19₁, 17₂, 19₂, ..., 17n and 19n one by one in this order (hereinafter referred to as "regular direction S1") every time a clock CLK2 or CLK1 is applied thereto. When the rotational direction specifying clock F/R is high, the rotation register 60 outputs an open signal to open the gates 17n, 19n, ..., 17₂, 19₂, 17₁ and 19₁ one by one in this order (hereinafter referred to as "reverse direction S2") every time a clock CLK2 or CLK1 is applied thereto.

When receiving four vertical synchronization clocks Vsync output from the signal generating section 4, the rotation register 60 is cleared. The vertical synchronization clock Vsync is output in synchronization with the scanner 1 starting the reading of one-page image of the document original.

Table 2 shows the relationship among the page of the document original to be read by the scanner 1, the page clocks $Q_0$ and $Q_1$, the rotational direction of the rotation register 60, the clock to be applied to the rotation register 60 and the data shift direction in the FIFO/LIFO memories 10. In Table 2, "0" and "1" denotes low level and high level, respectively, and N is a natural number.

TABLE 2

| Page No. | Page clock $Q_1$ | Page clock $Q_0$ | Rotation register | Clock CLK | FIFO/LIFO memory |
|---|---|---|---|---|---|
| 4N-3 | 0 | 0 | Regular direction S1 | CLK1 | Regular direction R1 |
| 4N-2 | 0 | 1 | Reverse direction S2 | CLK2 | Regular direction R1 |
| 4N-1 | 1 | 0 | Reverse direction S2 | CLK1 | Reverse direction R2 |
| 4N | 1 | 1 | Regular direction S1 | CLK2 | Reverse direction R2 |

Next, there will be explained an image data write-in operation and image 90°-rotating operation in the image processing section 50. In the following explanation, it is assumed for convenience that the FIFO/LIFO memories 10 have a total memory size of 5 lines×5 dots (square) and the size of the original image to be read is 5 lines×5 dots. In accordance with this embodiment, the combination of the page clocks $Q_0$ and $Q_1$ varies in a cycle of four pages, as shown in Table 2. Therefore, specific explanation will be given to the image data write-in and image rotating operations which are to be performed on the first page ((4N-3)-th page, N=1), the second page ((4N-2)-th page, N=1), the third page ((4N-1)-th page, N=1), the fourth page (4N-th page, N=1) and the fifth page ((4N-3)-th page, N=2) of the document original to be read by the scanner 1. It should be noted that some of the reference characters (e.g., FIFO/LIFO memory 10₂ and gate 17₂) used for convenience in the following description do not appear in FIG. 7.

First, the image data write-in operation to be performed when the first page of the document original is read will be explained.

When the reading of the first page of the document original is started, the rotation register 60 and dot counter 52 are cleared. At the time of the reading of the first page of the document original, the page clocks $Q_0$ and $Q_1$ are both low as shown in Table 2. Therefore, the image processing section 50 performs the image data write-in operation, if all the following conditions (a), (b) and (c) are satisfied.

(a) The gate 12a is open and the switch 13a establishes the continuity between the gate 12a and signal line 11a, whereby the image data generated by the scanner 1 is sent to the signal line 11a.

(b) A clock CLK1 is applied to the rotation register 60 every time the scanner 1 generates one-line image data.

(c) The rotation register 60 rotates in the regular direction S1 every time a clock CLK1 is applied thereto.

The rotation register 60 first outputs an open signal to the gates 171 and 191. As a result, a read-out clock RCLK is applied to the FIFO/LIFO memory 101 and a write-in clock WCLK is applied thereto with a delay of a half cycle. Therefore, dot data (1) of the first dot in the first line sent to the signal line 11a is written in the area closest to the signal line 11a in the FIFO/LIFO memory 101. When the first page of the document original is read, there is stored no image data in the FIFO/LIFO memory 101 and, hence, a read-out operation is not performed even if the read-out clock RCLK is applied to the FIFO/LIFO memory 101.

Since a clock CLK1 is applied to the rotation register 60 every time one-line data is generated, the gates 171 and 191 are kept open until the scanner 1 completes the generation of the one-line data. Thus, dot data (1), (2), (3), (4) and (5) of the second, third, fourth and fifth dots in the first line generated by the scanner 1 are successively written in the FIFO/LIFO memory 101 in this order.

When the scanner 1 thereafter generates dot data (6) of the first dot in the second line, a clock CLK1 is applied to the rotation register 60. In response thereto, the gates 171 and 191 are closed, and the gates 172 and 192 are opened. As a result, a write-in clock WCLK and read-out clock RCLK are applied to the FIFO/LIFO memory 102 and, hence, the dot data (6) of the first dot in the second line is written into the FIFO/LIFO memory 102 via the signal line 11a. Then, the other dot data (7), (8), (9) and (10) in the second line are successively written into the FIFO/LIFO memory 102 in this order in substantially the same manner as the aforesaid dot data (2), (3), (4) and (5) in the first line.

The third, fourth and fifth lines are processed in substantially the same manner as described above. Consequently, image data of the first page is stored in the FIFO/LIFO memories 10 in a storage state as shown in FIG. 8A.

The image 90°-rotating operation to be performed on the image data of the first page stored in the FIFO/LIFO memories 10 and the image reading and storing operation to be performed on the second page of the document original will next be explained.

When the reading of the second page of the document original is started, the rotation register 60 and dot counter 52 are cleared. At the time of the reading of the second page of the document original, the page clocks $Q_0$ and $Q_1$ are high and low, respectively, as shown in Table 2. Therefore, the image processing section 50 performs the image 90°-rotating operation, if all the following conditions (a) to (e) are satisfied.

(a) The gate 12a is open and the switch 13a establishes the continuity between the gate 12a and signal line 11a, whereby the image data generated by the scanner 1 is sent to the signal line 11a.

(b) The image data of the first page stored in the FIFO/LIFO memories 10 is to be shifted in the regular direction R1.

(c) The image data sent out of the FIFO/LIFO memories 10 is applied to the original image reproducing section 3 via the signal line 11b and gate 14b.

(d) A clock CLK2, which is output every time the image data of one dot is generated by the scanner 1, is applied to the rotation register 60.

(e) The rotation register 60 rotates in the reverse direction S2 every time a clock CLK2 is applied thereto.

The rotation register 60 first outputs an open signal to the gates 175 and 195. As a result, the read-out clock RCLK and write-in clock WCLK are applied to the FIFO/LIFO memory 105. Therefore, dot data (21), (22), (23), (24) and (25) of the first page stored in the FIFO/LIFO memory 105 are shifted by one dot in the regular direction R1, so that the dot data (21) is read out to the signal line 11b and applied to the original image reproducing section 3 via the gate 14b. On the other hand, dot data (1)' of the first dot in the first line of the second page applied to the signal line 11a is written in an area which has become empty as the result of the shifting of the dot data (25) of the first page.

A clock CLK2 is applied to the rotation register 60 every time one-dot data is generated as stated above. Therefore, when dot data (2)' of the second dot in the first line of the second page is generated, the gates 175 and 195 are closed and the gates 174 and 194 are opened. As a result, a read-out clock RCLK and write-in clock WCLK are applied to the FIFO/LIFO memory 104. In response thereto, dot data (16), (17), (18), (19) and (20) of the first page stored in the FIFO/LIFO memory 104 are shifted by one dot in the regular direction R1, so that the dot data (16) is read out to the signal line 11b and applied to the original image reproducing section 3 via the gate 14b. Dot data (2)' of the second dot in the first line of the second page applied to the signal line 11a is written in an area which has become empty as the result of the shifting of the dot data (20) of the first page.

By repeating this operation, the dot data (21), (16), (11), (6) and (1) are read out. Then, dot data (1)', (2)', (3)', (4)' and (5)' are written in areas of the FIFO/LIFO memories 10 which have become empty as the result of the one-dot shift operation in the regular direction R1. These empty areas are where the image data (25), (20), (15), (10) and (5) have been stored before the one-dot shift operation.

The second, third, fourth and fifth lines of the second page are processed in substantially the same manner as described above. Consequently, image data of the second page are stored in the FIFO/LIFO memories 10 in a storage state as shown in FIG. 8C. FIG. 8B shows a transition state between the storage states shown in FIGS. 8A and 8C, i.e., a storage state of the FIFO/LIFO memories 10 in which dot data (12)' of the second dot in the third line of the second page has just been written in the FIFO/LIFO memory 104.

The dot data (21), (16), . . . (1); (22), (17), . . . , (2); . . . of the first page stored in the FIFO/LIFO memories 10 are applied to the original image reproducing section 3 in this order, as mentioned above. That is, the dot data of the first dots in respective lines from the last line to the first line of the first page constitute the first line of the read-out image data. The dot data of the second dots in respective lines from the last line to the first line constitute the second line of the read-out image data. Therefore, the original image reproducing section 3 reproduces the image of the first page of the document original which has been rotated by an angle of 90°. That is, the image data shown in FIG. 10B is obtained by rotating the image data shown in FIG. 10A by an angle of 90°.

Next, the image reading and storing operation to be performed on the third page of the document original and image 90°-rotating operation to be performed at this time on the image data of the second page will be explained.

When the reading of the third page of the document original is started, the rotation register 60 and dot counter 52 are cleared. At the time of the reading of the third page, the page clocks $Q_0$ and $Q_1$ are low and high, respectively, as shown in Table 2. Therefore, the image processing section 50 performs the image 90°-rotating operation, if all the following conditions (a) to (e) are satisfied.

(a) The gate 12b is open and the switch 13b establishes the continuity between the gate 12b and signal line 11b, whereby the image data generated by the scanner 1 is sent to the signal line 11b.

(b) The image data of the second page stored in the FIFO/LIFO memories 10 is to be shifted in the reverse direction R2.

(c) The image data sent out of the FIFO/LIFO memories 10 is applied to the original image reproducing section 3 via the signal line 11a and gate 14a.

(d) A clock CLK1 is applied to the rotation register 60 every time the scanner 1 generates one-line data.

(e) The rotation register 60 rotates in the reverse direction S2 every time a clock CLK1 is applied thereto.

For the reading of the first line of the third page, a read-out clock RCLK and write-in clock WCLK are applied to the FIFO/LIFO memory 105 until a clock CLK1 is applied to the rotation register 60 for the reading of the first dot in the second line. Therefore, dot data (21)', (16)', (11)', (6)' and (1)' of the second page stored in the FIFO/LIFO memory 105 are read out to the signal line 11a in this order and applied to the original image reproducing section 3 via the gate 14a. Further, dot data (1)", (2)", (3)", (4)" and (5)" in the first line of the third page sent out to the signal line 11b are successively written into the FIFO/LIFO memory 105 in response to the read-out of the dot data (21)', (16)', (11)', (6)' and (1)' of the second page.

The second, third, fourth and fifth lines of the third page are processed in substantially the same manner as described above and, thus, the image data of the third page is stored in the FIFO/LIFO memories 10 in a storage state as shown in FIG. 9B. FIG. 9A shows a transition state between the storage states shown in FIGS. 8C and 9B, i.e., a storage state of the FIFO/LIFO memories 10 in which dot data (8)" of the third dot in the second line of the third page has just been written in the FIFO/LIFO memory 104.

The dot data (21)', (16)'. . . (1)'; (22)', (17)'. . . (2)'; . . . of the second page stored in the FIFO/LIFO memories 10 are applied to the original image reproducing section 3 in this order, as mentioned above. That is, the dot data of the first dots in respective lines of the second page constitute the first line of the read-out image data. The dot data of the second dots in respective lines constitute the second line of the read-out image data. Therefore, the original image reproducing section 3 reproduces the image of the second page of the document original which has been rotated by an angle of 90°.

Next, the image reading and storing operation to be performed on the fourth page of the document original and image 90°-rotating operation to be performed at this time on the image data of the third page will be explained.

When the reading of the fourth page of the document original is started, the rotation register 60 and dot counter 52 are cleared. At the time of the reading of the fourth page of the document original, high-level page clocks $Q_0$ and $Q_1$ are output, as shown in Table 2. Therefore, the image processing section 50 performs the image 90°-rotating operation, if all the following conditions (a) to (e) are satisfied.

(a) The gate 12b is open and the switch 13b establishes the continuity between the gate 12b and signal line 11b, whereby the image data generated by the scanner 1 is sent to the signal line 11b.

(b) The image data of the third page stored in the FIFO/LIFO memories 10 is to be shifted in the reverse direction R2.

(c) The image data sent out of the FIFO/LIFO memories 10 is applied to the original image reproducing section 3 via the signal line 11a and gate 14a.

(d) A clock CLK2 is applied to the rotation register 60 every time the scanner 1 generates one-dot data.

(e) The rotation register 60 rotates in the regular direction S1 every time a clock CLK2 is applied thereto.

For the reading of the first line of the fourth page, a clock CLK2 is applied to the rotation register 60 every time dot data in the first line is generated. In response to the generation of the respective dot data in the first line, a read-out clock RCLK and write-in clock WCLK are applied to the FIFO/LIFO memories 101, 102, . . . and 105 in this order. Therefore, dot data (21)", (16)", (11)", (6)" and (1)" of the third page respectively stored in the FIFO/LIFO memories 101, 102, . . . and 105 are read out to the signal line 11a in this order and applied to the original image reproducing section 3 via the gate 14a. Further, dot data (1)''', (2)''', (3)''', (4)''' and (5)''' in the first line of the fourth page sent out to the signal line 11b are written into the FIFO/LIFO memories 101, 102, 103, 104 and 105, respectively.

The second, third, fourth and fifth lines of the fourth page are processed in substantially the same manner as described above and, thus, the image data of the fourth page is stored in the FIFO/LIFO memories 10 in a storage state as shown in FIG. 9D. FIG. 9C shows a transition state between the storage states shown in FIGS. 9B and 9D, i.e., a storage state of the FIFO/LIFO memories 10 in which dot data (13)''' of the third dot in the third line of the fourth page has just been written in the FIFO/LIFO memory 103.

The dot data (21)", (16)", . . . (1)"; (22)", (17)", . . . and (2)"; . . . of the third page stored in the FIFO/LIFO memories 10 are applied to the original image reproducing section 3 in this order, as mentioned above. That is, the dot data of the first dots in respective lines of the third page constitute the first line of the read-out image data. The dot data of the second dots in the respective lines constitute the second line of the read-out image data. Therefore, the original image reproducing section 3 reproduces the image of the third page of the document original which has been rotated by an angle of 90°.

Next, the image 90°-rotating operation to be performed on image data of the fourth page when the fifth page of the document original is read will be explained.

An explanation for the image data write-in operation for the fifth page of the document original is omitted, because this operation is substantially the same as the image data write-in operation for the first page in accordance with this embodiment, except that there have already been stored image data in FIFO/LIFO memories 10. Therefore, a brief explanation will be given to how to read out the image data stored in the FIFO/LIFO memories 10 in the case of the fifth page.

A clock CLK1 is applied to the rotation register 60 every time the scanner 1 generates one-line of image data. In response to the scanner 1 generating line data of the first, second, . . . and fifth line, a read-out clock RCLK is successively applied to the FIFO/LIFO memories 101, 102, . . . and 105 in this order. Therefore, dot data (21)''', (16)''', . . . (1)'''; (22)''', (17)''', . . . and (2)'''; . . . of the fourth page stored in the FIFO/LIFO memories 10 are applied to the original image reproducing section 3 via the signal line 11b and gate 14b. That is, the dot data of the first dots in respective lines of the fourth page constitute the first line of the read-out image data. The dot data of the second dots in the respective lines constitute the second line of the read-out image data. Therefore, the original image reproducing section 3 reproduces the image of the fourth page of the document original which has been rotated by an angle of 90°.

As can be understood from the foregoing, the digital copying machine of this embodiment realizes the image 90°-rotating operation by changing the image data read-out/write-in method in the FIFO/LIFO memories 10 every time a new page of a document original is read. Further, since new image data is written in the FIFO/LIFO memories 10 at substantially the same time of the read-out of previously stored image data, respective pages of the document original can successively be read, thereby preventing the slow down in the copying operation due to the image 90°-rotating operation.

Further, there is no need to increase the reading speed of the scanner 1 to ensure a copying speed comparative to that of a conventional copying machine, thereby reducing the hardware cost of the digital copying machine.

Still further, the digital copying machine of this embodiment eliminates a need for complicated address calculation by employing the FIFO/LIFO memories 10 for the storage of image data, thereby simplifying the process sequence of the copying operation.

If it is desired to make a plurality of copies of an image reproduce from one-page image data subjected to the image 90°-rotating operation, the following operation may be performed.

Specifically, the page renewal gate clock SCLK is kept at low-level so that the reading page renewal gate 70 is in the non-active state where the gate 70 is closed. Accordingly, low level signals are applied to the switches 13a and 13b, and these switches 13a and 13b establish the continuity between the signal lines 11a and 11b. The data sent from the scanner 1 are prevented from being applied to the signal lines 11a or 11b. The trigger clock TCLK and CLK2 are applied in the same manner as in the case where the page of the document original is renewed. By this operation, dot data representative of image data subjected to the 90°-rotating operation is applied to the original image reproducing section 3 every time a trigger clock TCLK is applied.

More specifically, dot data read out from one of the FIFO/LIFO memories 10 is sent to the original image reproducing section 3 through the signal lines 11a or 11b and the gate 14a or 14b. At this time, the dot data is also transferred from one of the signal lines 11a and 11b, the one to which the dot data has been read out, to the other thereof via switch 13a and 13b. The dot data transferred to the other of the signal lines 11a and 11b is written into the one of the FIFO/LIFO memories 10 from which the dot data has been read out. This writing operation is performed in synchronization with the write-in clock WCLK whose phase is shifted by a half cycle with respect to the read-out clock RCLK.

When a new page of the document original is read by the scanner 1, the reading page renewal gate 70 is set in the active state, the open state, by a high level page renewal gate clock SCLK. Thus, the switches 13a and 13b respectively establish, in synchronization with the trigger clock TCLK, the continuity between the gate 12a and the signal line 11a and the continuity between the gate 12b and the signal line 11b. In this case, data are transferred in the same manner as in the case where one reproduced image is produced for one page of the document original. It is needless to say that data to produce the last reproduced image of the previous page is transferred to the original reproducing section 3 simultaneously with writing the image data of the new page into the FIFO/LIFO memories 10.

Figure 11:
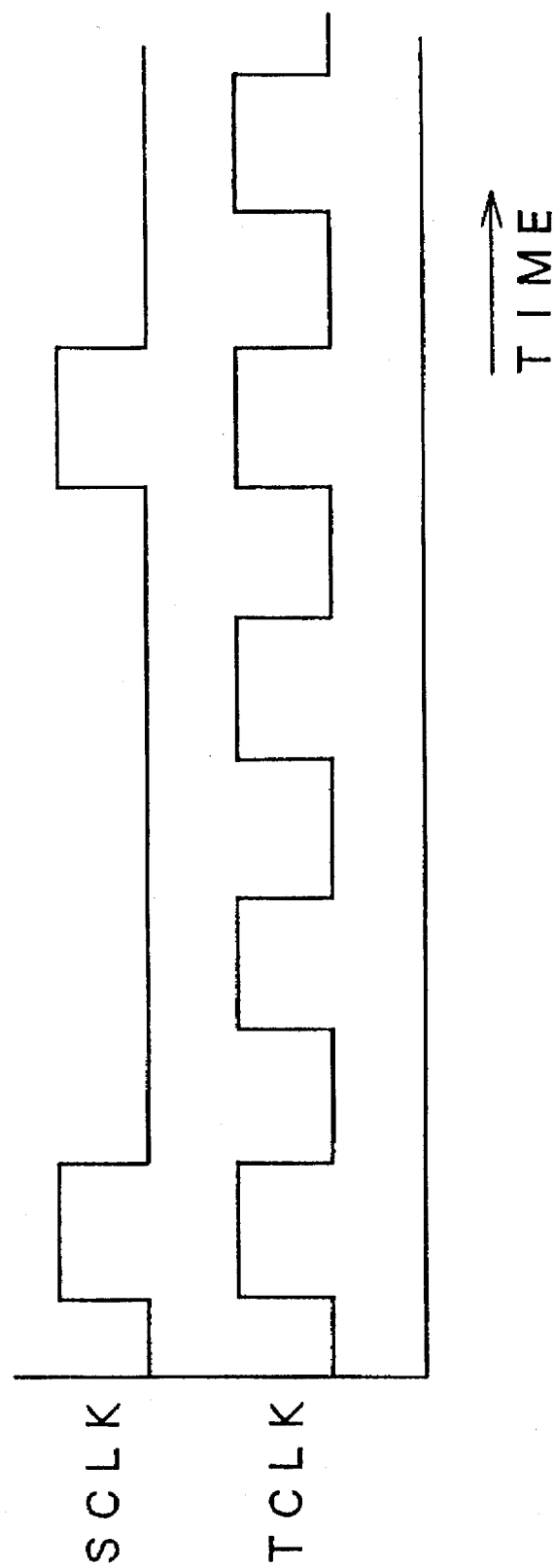
FIG. 11 is a wave form chart showing wave forms of a page renewal gate clock SCLK and trigger clock TCLK in the case where three images are reproduced from one page image.
Figure 12A:
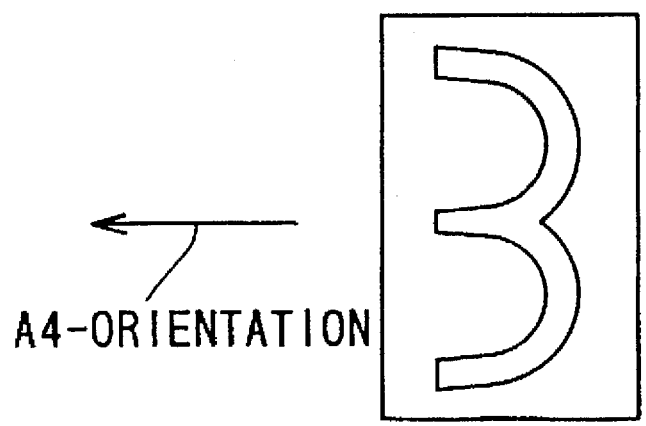
FIGS. 12A and 12B are diagrams for explaining the image 90°-rotating operation.
Figure 12B:
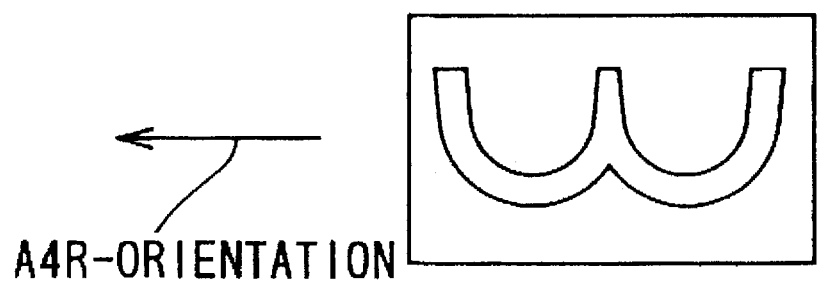

FIG. 11 shows the wave forms of the page renewal gate clock SCLK and the trigger clock TCLK in the case where three images are reproduced from one page image. The page renewal gate clock SCLK is at high level for a period when image data for a new page of the document original is output by the scanner 1. In one cycle of the page renewal gate clock SCLK, the trigger clock TCLK undergoes three cycles. That is, the trigger clock TCLK becomes at high-level three time. During the trigger clock TCLK is at high-level, one-page image data is transferred to the original image reproducing section 3. Thus, one-page image data produced from one page of the document original is applied to the original image reproducing section 3 three times in one cycle of the page renewal gate clock SCLK. Consequently, three reproduced imaged for one page of the document original are produced by the original reproducing section 3.

Though this embodiment employs the FIFO/LIFO memories 10 as a storage means, a counter and random access memory (RAM) may otherwise be employed as the storage means. In such a case, the counter calculates an address in the RAM by counting clocks CLK2 applied thereto.

The foregoing first and second preferred embodiments employ digital copying machines to explain the image processing apparatus of the present invention. However, the present invention can widely be applied to various image processing apparatuses including facsimile machines.

Although the present invention has been described in detail by way of the embodiments thereof, it should be understood that the foregoing disclosure is merely illustrative of the technical principles of the present invention and not limitative of the same. The spirit and scope of the present invention are to be limited only by the terms of the appended claims.

What is claimed is:

1. An image processing apparatus comprising:
   an optical reading means for optically scanning a document original and outputting dot data constituting one-page image data of the document original, said one-page image data being represented by a plurality of lines each having a plurality of dots;
   a storage means for storing one-page image data constituted of the dot data output from said optical reading means, said storage means having a plurality of storage areas for respectively storing therein the dot data constituting the one-page image data, said storage areas respectively having addresses which are preliminarily assigned thereto along a dot array from a first dot in a first line to a last dot in a last line;
   a clock outputting means for outputting a clock indicative of completion of image reading every time said optical reading means completes reading a one-page image of the document original;
   an address specifying means for specifying an address of a storage area of said storage means, said address specifying means being operable in a first operational state in which addresses are successively specified along the dot array in said storage means and a second operational state in which addresses are successively specified along a line array in said storage means, said first and second operational states being alternately switched every time said clock outputting means outputs the clock; and
   a read-out/write-in controlling means for reading out dot data stored in the storage area of said storage means having the address specified by said address specifying means and for writing dot data output from said optical reading means into the storage area of said storage means having the address specified by said address specifying means at substantially the same time.

2. An image processing apparatus as set forth in claim 1, wherein said storage means stores therein the one-page image data represented by the plural lines the number of which is equal to that of dots included in each line.

3. An image processing apparatus comprising:

an optical reading means for optically scanning a document original and outputting dot data constituting one-page image data of the document original, said one-page image data being represented by a plurality of lines each having a plurality of dots;

a storage means, having a plurality of memories, for storing therein the one-page image data output from said optical reading means, said plurality of memories each being capable of storing one-line data;

a clock outputting means for outputting a clock indicative of completion of image reading every time said optical reading means completes reading a one-page image of the document original;

a write-in/read-out clock generating means for alternately performing a first operation and a second operation, in said first operation, a first write-in clock for allowing the dot data output from said optical reading means to be successively written in said plural memories on a line-by-line basis and a first read-out clock for allowing the dot data to be successively read out of said plural memories on a line-by-line basis are generated at substantially the same time, and in said second operation, a second write-in clock for allowing the dot data output from said optical reading means to be cyclically written in said plural memories in units of dot data constituting one-line data and a second read-out clock for allowing the dot data constituting one-line data to be cyclically read out of said plural memories on a dot-by-dot basis are generated at substantially the same time, said first and second operations being alternately switched every time said clock outputting means outputs the clock; and a write-in/read-out controlling means for controlling write-in and read-out operations for said plural memories based on the first write-in clock, the first read-out clock, the second write-in clock and the second read-out clock generated by the write-in/read-out clock generating means.

4. An image processing means as set forth in claim 3, wherein the number of said plural memories included in said storage means is the same as that of unit storage areas included in each of said plural memories, said unit storage areas each being capable of storing one-dot data.

5. An image forming apparatus as set forth in claim 3, further comprising:

data input controlling means for applying dot data read out of said storage means, instead of dot data generated by said optical reading means, to said storage means, said data input means being activated in an event that a one-page image data stored in said storage means are to be output a plurality of times.

6. An image processing apparatus comprising:

an optical reading means for optically scanning a document original and outputting dot data constituting one-page image data of the document original, said image data being represented by a plurality of lines each having a plurality of dots;

a storage means for storing one-page image data constituted of the dot data output from said optical reading means, said storage means having a plurality of storage areas capable of respectively storing therein the dot data constituting the one-page image data, said storage means being capable of allowing the dot data to be read therefrom and written therein along a dot array and along a line array;

a read-out controlling means for controlling a read-out operation to read out the dot data stored in said storage means by alternately switching the read-out operation between a first read-out operation and a second read-out operation every time said optical reading means completes reading a one-page image of the document original, said first read-out operation being an operation in which the dot data are successively read out of said storage means along the dot array, said second read-out operation being an operation in which the dot data are successively read out of said storage means along the line array; and a write-in controlling means for writing dot data newly generated by said optical reading means in a storage area from which previous dot data has been read out, at substantially the same time when the previous dot data is read out of said storage means.

7. An image processing apparatus as set forth in claim 6, wherein said storage means stores therein the one-page image data represented by said plural lines the number of which is equal to that of dots included in each line.

8. An image forming apparatus as set forth in claim 6, further comprising:

data input controlling means for applying dot data read out of said storage means, instead of dot data generated by said optical reading means, to said storage means, said data input means being activated in an event that a one-page image data stored in said storage means are to be output a plurality of times.

9. An image processing method comprising:

optically scanning a document original by an optical reading means to generate dot data constituting one-page image data of the document original, said image data being represented by a plurality of lines each having a plurality of dots;

writing the dot data generated by the optical reading means in a storage means for storing one-page image data in a plurality of storage areas capable of respectively storing therein the dot data and for allowing the dot data to be read therefrom and written therein along a dot array and along a line array;

reading out the respective dot data stored in the storage means;

alternately switching, every time the optical reading means completes reading a one-page image of the document original, a read-out method between a first read-out method in which the dot data are successively read out of the storage means along the dot array and a second read-out method in which the dot data are successively read out of said storage means along the line array; and controlling a write-in operation so that dot data newly generated by said optical reading means is written in a storage area of the storage means from which previous dot data has been read out at substantially the same time when the previous dot data is read out of the storage means.

10. A method as set forth in claim 9, further comprising:

in an event that a one-page image data stored in the storage means are to be output a plurality of times, preventing dot data generated by the optical reading means from being written into the storage means, and applying dot data read out of the storage means to the storage means to write the dot data therein.

* * * * *